United States Patent [19]

Maaz et al.

[11] Patent Number: 4,991,973
[45] Date of Patent: Feb. 12, 1991

[54] ELECTRONIC BALANCE WITH SCALE ON TOP

[75] Inventors: Günther Maaz, Uslar; Klaus Dardat, Dransfeld; Alfred Klauer, Göttingen, all of Fed. Rep. of Germany

[73] Assignee: Sartorius AG, Göttingen, Fed. Rep. of Germany

[21] Appl. No.: 358,138

[22] Filed: May 30, 1989

[30] Foreign Application Priority Data

Jun. 4, 1988 [DE] Fed. Rep. of Germany ....... 3819073

[51] Int. Cl.⁵ .......................... B01F 7/16; B01F 13/08; G01G 7/04; G01G 21/22
[52] U.S. Cl. ..................................... 366/141; 177/212; 177/243; 177/245; 366/274
[58] Field of Search ....................... 366/273, 274, 141; 177/212, 245, 243, 185

[56] References Cited

U.S. PATENT DOCUMENTS

| | | | |
|---|---|---|---|
| 3,171,636 | 3/1965 | Barlow et al. | 177/245 X |
| 3,554,497 | 1/1971 | Zipperer | 366/274 X |
| 3,693,941 | 9/1972 | Suchy | 366/274 |
| 4,199,265 | 4/1980 | Sanderson et al. | 366/274 |
| 4,209,259 | 6/1980 | Rains et al. | 366/273 |
| 4,212,547 | 7/1980 | Thomson | 366/141 X |
| 4,334,786 | 6/1982 | Delcoigne et al. | 366/141 X |
| 4,379,495 | 4/1983 | Cocks et al. | 177/185 X |
| 4,597,458 | 7/1986 | Knothe et al. | 177/212 X |
| 4,725,149 | 2/1988 | Kawakami et al. | 366/273 X |
| 4,752,138 | 6/1988 | Rufer | 366/273 X |
| 4,782,904 | 11/1988 | Brock | 177/185 X |

FOREIGN PATENT DOCUMENTS

| | | | |
|---|---|---|---|
| 3530169 | 3/1987 | Fed. Rep. of Germany | 177/212 |
| 622115 | 4/1949 | United Kingdom | 366/274 |

Primary Examiner—Harvey C. Hornsby
Assistant Examiner—Scott J. Haugland
Attorney, Agent, or Firm—Eric P. Schellin

[57] ABSTRACT

An electronic balance with scale on top having a drive means for a magnetic agitator which integral onto the balance scale. This enables the work steps of agitating and weighing to be performed simultaneously and by the same device.

2 Claims, 4 Drawing Sheets

ELECTRONIC BALANCE WITH SCALE ON TOP

BACKGROUND OF THE INVENTION

The invention relates to a generally known electronic balance with a scale on top.

It is generally known that magnetic agitators or mixers can be used, in the case of which a magnetic rotary field is generated by several coils outside the vessel and a permanent magnet within the vessel is entrained and rotated by this rotary field. Furthermore, U.S. Pat. No. 4,725,149 teaches that a balance with a scale on top and at least one magnetic agitator can be placed adjacent to each other and that the container with the material to be weighed can be transported back and forth by a rotary table between the balance and the magnetic agitator, with automates dosing and mixing processes.

The invention has the object of further developing an electronic balance with a scale on top in such a manner that the balance can assume the function of the agitator and that a simultaneous weighing and agitating are possible.

SUMMARY OF THE INVENTION

The invention solves this object in that the drive means for a magnetic agitator are integrated into the balance scale.

This integration frequently results in a considerable savings of time since the time for the weighing followed by placing into a separate magnetic agitator is eliminated. Instead, the weighing takes place simultaneously during the agitating process. In addition, it is also possible, for example, to prevent the settling of particles in suspensions during the weighing procedure so that that the suspension can be further processed immediately after the weighing. This makes possible e.g. a portioning removal of the suspension from a storage container directly from the balance. Also, continuous filtrations and concentrations can be gravimetrically monitored in conjunction with filtering agitator cells like those known e.g. from DE-OS No. 34 45 446.

BRIEF DESCRIPTION OF THE DRAWINGS

The invention is described in the following with reference made to the schematic figures.

DETAILED DESCRIPTION OF THE INVENTION

Figure 1:
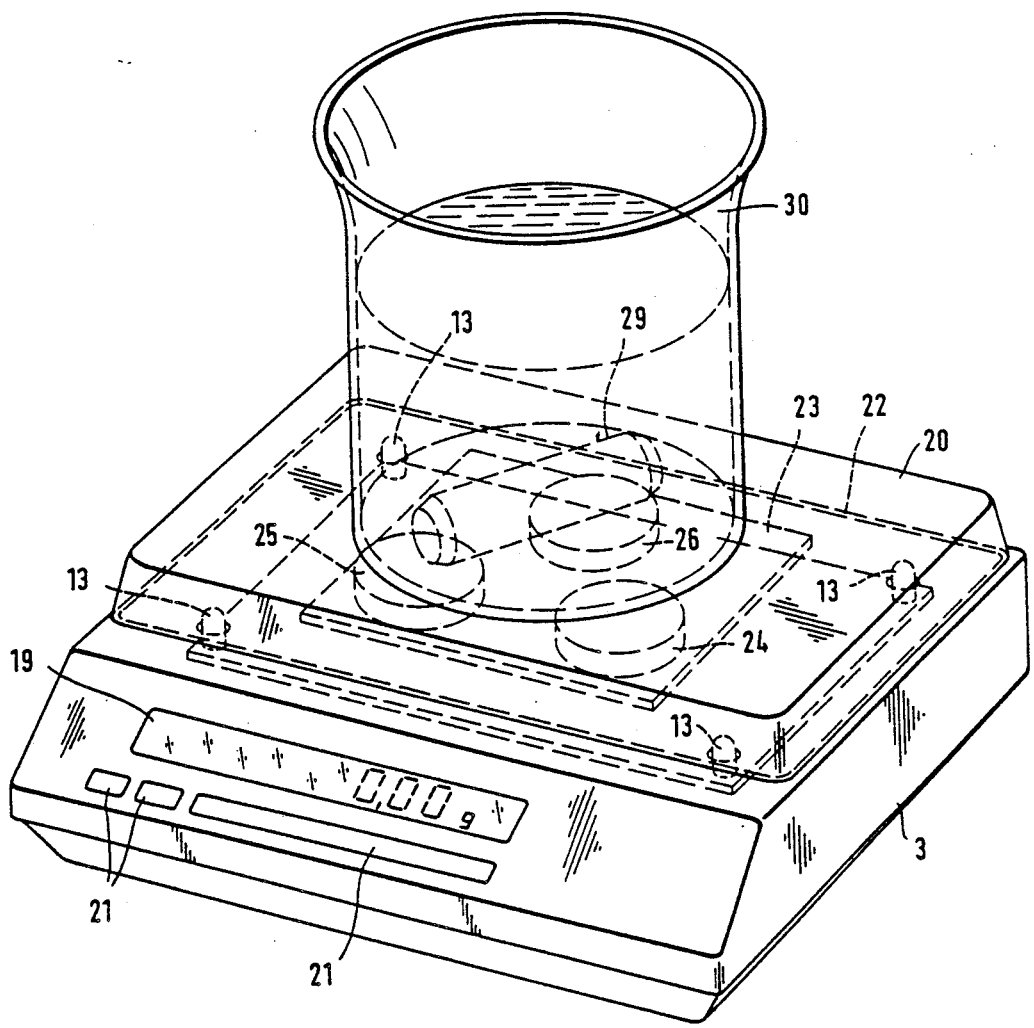
FIG. 1 shows a perspective overall view of the balance.

The perspective overall view of the balance in FIG. 1 shows housing 3, balance scale 20, display 19 and operating keys 21. Balance scale 20 is designed somewhat higher than is the case in customary balances in order to receive drive means for a magnetic agitator. These drive means can consist e.g. of a flat electromotor with a vertical shaft which carries a permanent magnet on its upper end; or, they can also consist of several coils through which an alternating current flows in such a manner that a magnetic rotary field is generated above the balance scale. The actual agitator element then consists of a permanent magnet 29 which rests on the bottom of vessel 30 or of the filter cell and is entrained by the magnetic rotary field as soon as the vessel is set on the balance scale. Details of the design and of the shaping of magnetic agitators are known from the known devices and can be relied upon for the integrated solution of the invention, so that they do not have to be explained in detail here. These drive means, covered by the balance scale, are indicated in dotted lines in FIG. 1 for the sake of clarifying the invention in the form of three coils 24, 25, 26 fastened to a soft magnetic yoke plate 23.

Figure 2:
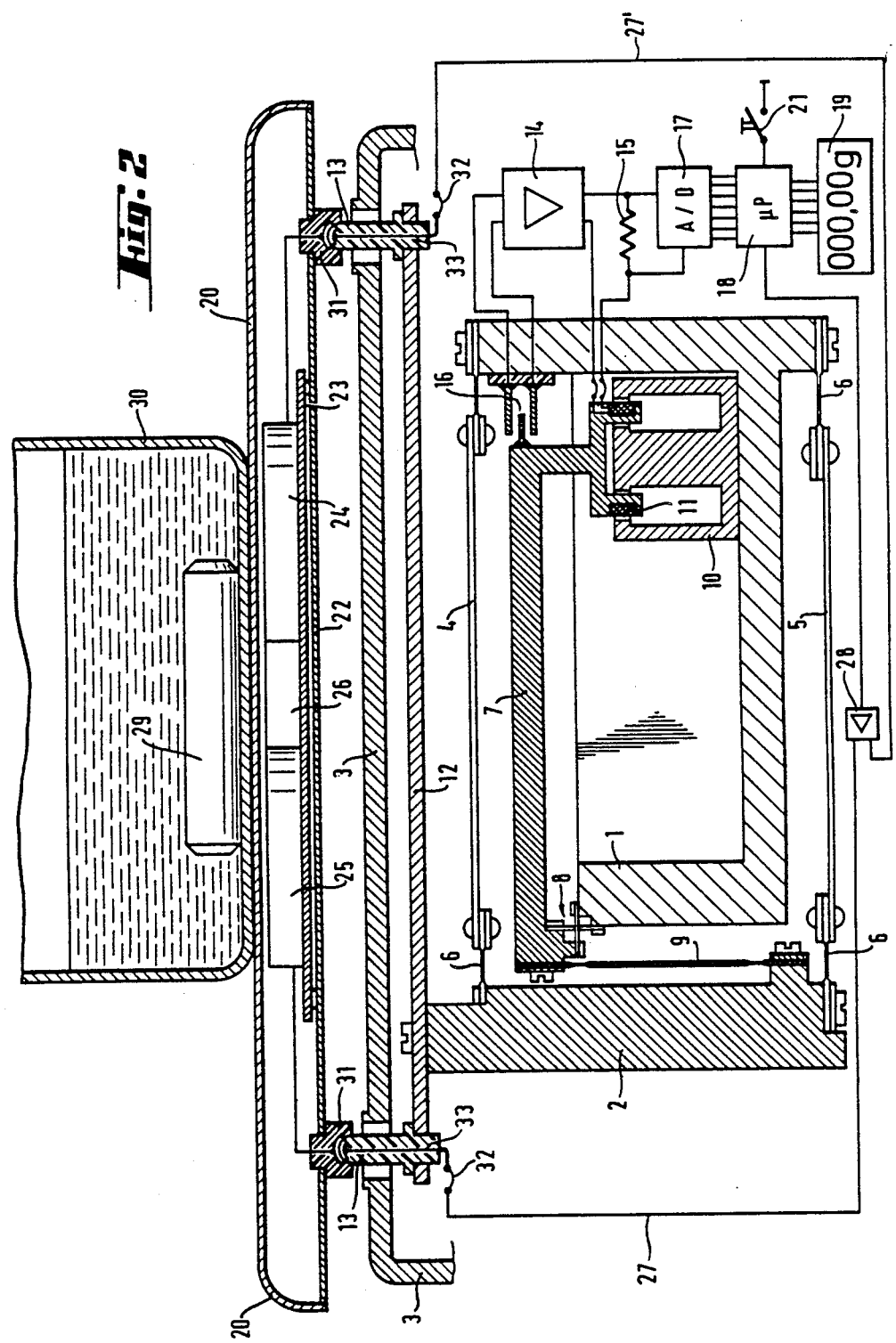
FIG. 2 shows a section through the essential mechanical parts of the balance and a block diagram of the electronic components.

FIG. 2 shows a section through the essential mechanical parts of the balance and a block diagram of the electronic components. Housing 3 is indicated only in part. The weighing system consists of a system carrier 1 on which a load receiver 2 is fastened in a vertically movable manner via two guide rods 4, 5 with moving joints 6. Lower scale 12 is fastened to load receiver 2, which lower scale carries the actual balance scale 20/22 via insulating rubber pads 13 and likewise insulating counterpieces 31.

The force corresponding to the mass of the material to be weighed is transferred from load receiver 2 via coupling element 9 onto the load arm of translation lever 7. Translation lever 7 is mounted by means of cross spring joint 8 to system carrier 1. A coil shell with a coil 11 is fastened to the compensation arm of translation lever 7. Coil 11 is located in the air gap of permanent magnet system 10 and generates the compensation force. The magnitude of the compensation current through coil 11 is regulated thereby in a known manner by a position sensor 16 and an automatic gain control amplifier 14 in such a manner that equilibrium prevails between the weight of the material being weighed and the electromagnetically generated compensation force. The compensation current generates a measuring voltage on measuring resistor 15 which is supplied to analog-to-digital converter 17. The digitized result is received by digital signal processing unit 18 and digitally displayed in display 19. Only one of the various operating keys 21 is sketched in FIG. 2. These parts of the weighing system of the electronic balance are generally known and therefore only described in a cursory manner above.

In addition, three coil 24, 25, 26 are present in balance scale 20/22 which are fastened to a soft magnetic yoke 23. These coils are supplied with alternating currents via leds 27, 27'. The phase position of these alternating currents to each other is selected so that a magnetic rotary field is generated above the coils on the balance scale. An agitator magnet in the container on the balance scale is entrained by this rotary field. The top 20 of the balance scale must therefore consist of a non-magnetic material. The penetration of the magnetic field lines downward is prevented by soft magnetic yoke 23 and by lower plate 22 of balance scale 20/22, which lower plate is likewise soft magnetic. In this manner, weighing errors due to magnetic forces between coils 24, 25, 26 and e.g. permanent magnet 10 are prevented. The magnetic forces between coils 24, 25, 26 and the agitator magnet in the container on the balance scale do not disturb the weighing since they cancel themselves out as inner forces within the system to be weighed.

Only two of the total of four current supplies for the three coils 24, 25, 26 are sketched in FIG. 2. The other two current supplies are designed in the same manner. Leads 27, 27' fixed to the housing are connected via flexible connections 32 to current lead-in 33 inside insulating rubber pad 13. Flexible connections 32 are necessary for preventing force reactions on the weighing system. Current lead-in 33 terminate in contact plates on the top of rubber pads 13. In a corresponding manner, insulating pieces 31 carry contact plates on their bottom to which the leads to coils 24, 25, 26 are connection. As a result of this design of the current supplies, balance scale 20/22 can be raised and e.g. cleaned, and when reset on rubber pads 13, the electric connection to coils 24, 25, 26 is automatically reestablished.

Any dynamic disturbing forces due to the motion of the agitator and of the material to be weighed are suppressed practically completely by digital filtering in digital signal processing unit 18. To this end, digital signal processing unit 18 generates the signals for the control of coils 24, 25, 26 itself. Only power amplifier 28 is present as a separate component outside digital signal processing unit 18. The exact agitating frequency is known, as a consequence thereof, to digital signal processing unit 18, so that it can select the filtering algorithm in such a manner in the digital filtering of the measured values from the measured-value receiver that this frequency in particular can be suppressed in an especially sharp fashion. As a result, the dynamic disturbing forces produced by the agitation have practically no effect on the weighing result in the display.

Figure 3:
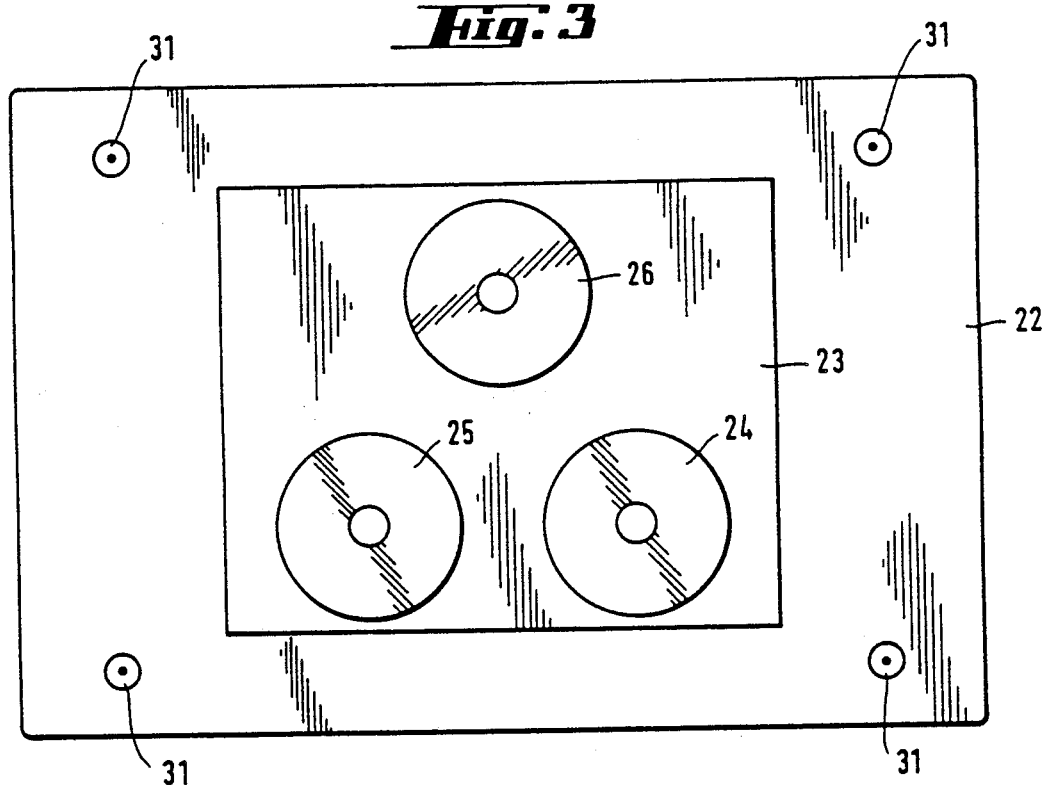
FIG. 3 shows a top view of the drive means for the magnetic agitator.

FIG. 3 shows another top view of the lower plate 22 of the balance scale it shows the arrangement of the three coils 24, 25, 26 on soft magnetic yoke 23. The centers of the three coils form an equilateral triangle. If the three coils are supplied with three alternating voltages whose phase position is shifted in each instance by 120° in relation to each other, the rotary field required for the agitator magnet is produced.

Figure 4:
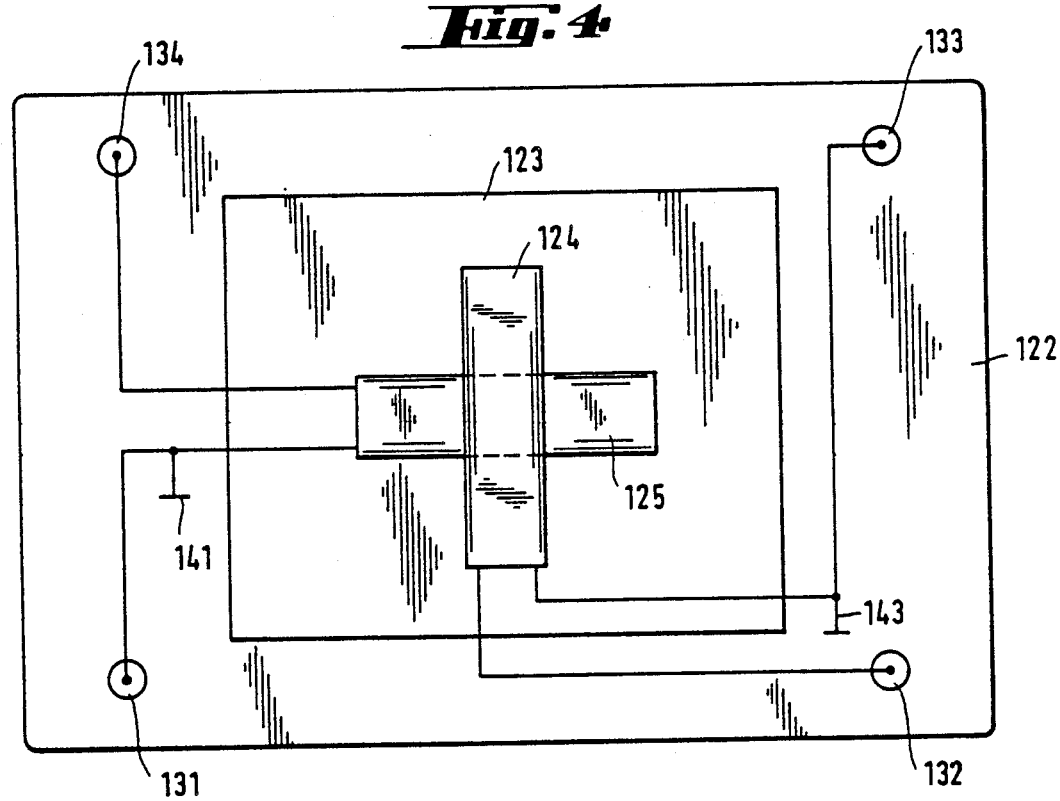
FIG. 4 shows a detail of the balance in another embodiment.

Another embodiment of the drive coils for the magnetic agitator in the balance scale is shown in FIG. 4. Lower plate 122 and soft magnetic yoke 123 correspond to parts 22 and 23 of the first embodiment according to FIGS. 2, 3. Instead of the three coils in the first embodiment, two coils 124, 125 with a horizontal coil axis are present in the embodiment according to FIG. 4, which two coils are positioned vertically to one another. Coils 124, 125 are regulated with two alternating voltages off set by 90° from one another so that a rotary field is generated once again. The winding ends of the two coils 124, 125 run to the four connection points 131, 132, 133, 134 which establish the connection to the electronic components inside the balance in the manner already described via insulated connection plates. In this embodiment the two connection points 131, 133 can be connected to the balance scale in an electrically conductive manner ground connection 141, 143. In like manner, the two corresponding leads in the housing can be connected to the ground potential. In its manner, a ground connection of the balance scale is established. In spite of this, balance scale 120/122 can be placed as desired onto the connection and support points since the two ground points 131, 133 exchange places at a 180° rotation of the balance scale and only the control of the two coils is interchanged, which has no influence on the agitating action.

The balance scale should be able to be turned on as desired in a similar manner in the embodiment according to FIGS. 2, 3, then the three coils must be connected e.g. in a delta connection and the three connection and support points arranged in the corners of an equilateral triangle. The ground connection of the balance scale can then take place e.g. via three resistors in a Y-connection.

Figure 5:
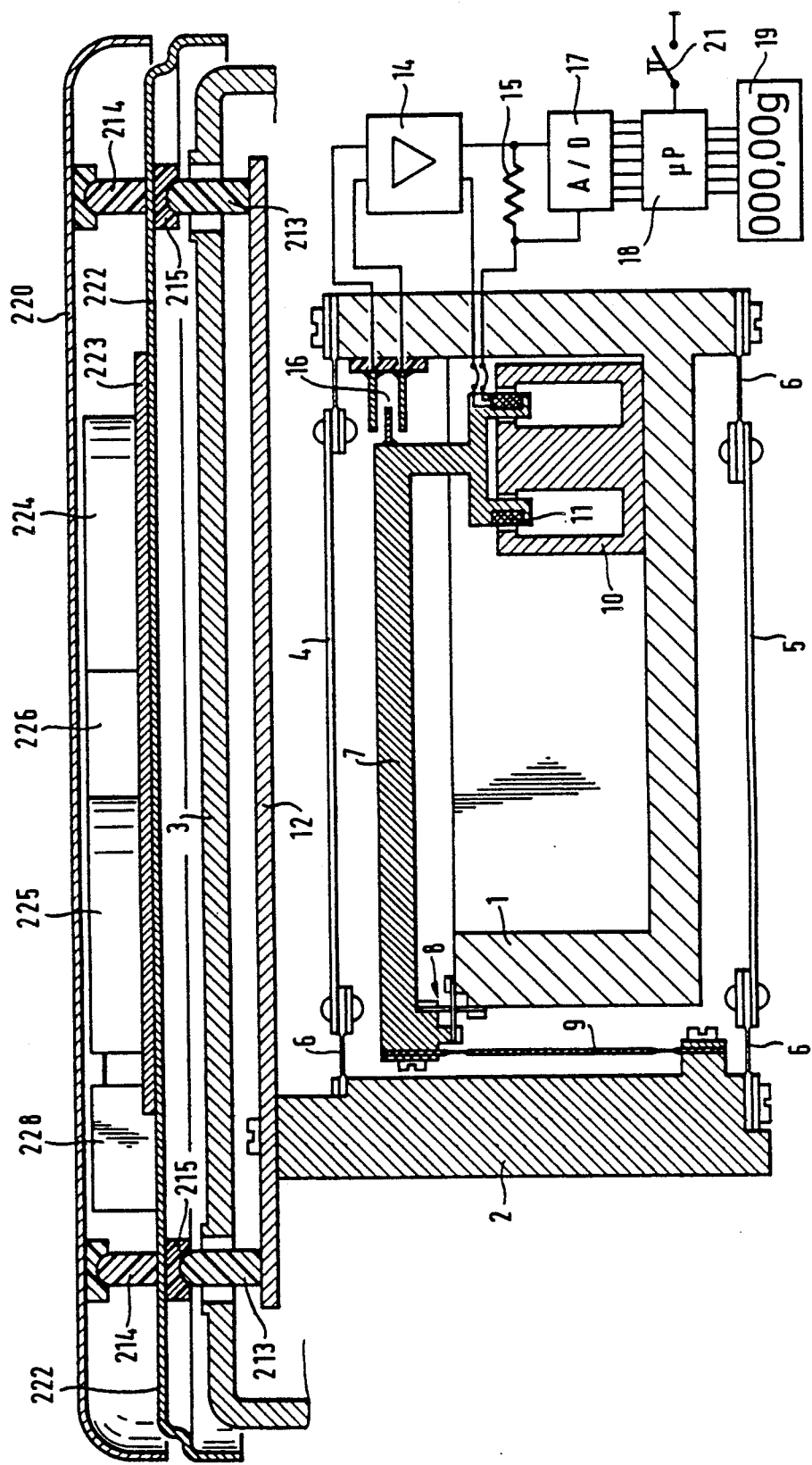
FIG. 5 shows a section through the balance in a third embodiment.

FIG. 5 shows a third embodiment in which the drive means are fastened to an intermediate scale, thus making it readily possible to retrofit. The actual weighing system, the housing and the components, that is, the parts with reference numerals 1 to 21, are designed exactly as in the first embodiment. Balance scale 220, which rests without agitating addition directly on rubber pads 213, rests on intermediate pads 214 when an agitating addition is inserted. Intermediate pads 214 are fastened to intermediate scale 222 which carries drive coils 224, 225 and 226 of the magnetic agitator. Concave spacers 215 are attached under intermediate scale 222 directly below intermediate pads 214 with which spacers intermediate scale 222 is supported on rubber pads 213 and therewith on the weighing system. Furthermore, soft magnetic yoke 223 is fastened onto intermediate scale 222. The regulating electronic components can either be fastened as a unit subassembly or module 228 likewise onto intermediate scale 222 or they can be housed separately.

What is claimed is:

1. An electronic balance having a magnetically driven agitator comprising:
   weighing scale on top of said electronic balance,
   magnetic shield means positioned on said weighing scale,
   drive means for the magnetically driven agitator positioned on said magnetic shield means and having a plurality of coils fastened to the weighing scale adapted and constructed to generate a magnetic rotary field.
   said magnetic shield means being of a dimensional size whereby to magnetically isolate said electronic balance from said drive means for said magnetically driven agitator,
   said weighing scale having a plurality of first support points terminating in first electrically conducting means,
   said first electrically conducting means being electrically connected to said coils,
   said electronic balance having a plurality of second support points terminating in second electrically conducting means adapted and constructed to be in abutting electrical communication with said first support point and to support said weighing scale, and a source of alternating electric current connected to said second electrically conducting means.

2. An electronic balance having a magnetically driven agitator comprising:
   weighing scale of said electronic scale,
   magnetic shield means positioned on said weighing scale,
   drive means for the magnetically driven agitator positioned on said magnetic shield means and having a plurality of coils adapted and constructed to generate a magnetic rotary field,
   said magnetic shield means being of a dimensional size whereby to magnetically isolate said electronic balance form said drive means for said magnetically driven agitator, said weighing scale having a plurality of first support points terminating in first electrically conducting means,
said first electrically conducting means being electrically connected to said coils,
said electronic balance having a plurality of second support points terminating in second electrically conducting means adapted and constructed to be in abutting electrical communication with said first support points and to support said weighing scale, and a source of alternating electric current connected to said second electrically conducting means.

* * * * *